(12) United States Patent
Reynertson, Jr.

(10) Patent No.: US 6,799,919 B2
(45) Date of Patent: Oct. 5, 2004

(54) COUPLING WITH ENHANCED CONCENTRICITY MAINTAINABILITY AND TORQUE HANDLING CAPABILITY

(75) Inventor: John L. Reynertson, Jr., Geneva, IL (US)

(73) Assignee: Ryeson Corporation, Franklin Park, IL (US)

( * ) Notice: Subject to any disclaimer, the term of this patent is extended or adjusted under 35 U.S.C. 154(b) by 2 days.

(21) Appl. No.: 10/309,714

(22) Filed: Dec. 4, 2002

(65) Prior Publication Data

US 2004/0109723 A1 Jun. 10, 2004

(51) Int. Cl.[7] .............................. F16B 21/00; B23Q 3/12
(52) U.S. Cl. .................... 403/322.2; 403/316; 403/325; 81/177.85; 279/2.12; 279/2.23
(58) Field of Search ................ 403/19, 20, 57, 403/292, 297, 315–317, 325, 321–322.3, DIG. 6; 81/177.85; 279/2.11, 2.12, 2.23, 69, 74; 312/111, 140; 464/18, 139, 901

(56) References Cited

U.S. PATENT DOCUMENTS

| | | | |
|---|---|---|---|
| 2,038,466 A | | 4/1936 | Yates |
| 3,498,653 A | | 3/1970 | McCreery |
| 3,532,013 A | * | 10/1970 | Haznar ................... 81/177.85 |
| 3,822,951 A | * | 7/1974 | Bornzin .................. 403/322.2 |
| 3,835,666 A | | 9/1974 | Hoffman |
| 4,218,940 A | | 8/1980 | Main |
| 4,350,463 A | * | 9/1982 | Friedline .................. 279/2.12 |
| 4,571,129 A | * | 2/1986 | Strand ...................... 279/2.11 |
| 4,589,308 A | | 5/1986 | Palm |
| 4,603,998 A | * | 8/1986 | Bober et al. ............. 403/322.2 |
| 4,753,626 A | | 6/1988 | Hazebrook et al. |
| 4,781,085 A | * | 11/1988 | Fox, III ................... 81/177.85 |
| 4,846,763 A | * | 7/1989 | Di Stefano ................. 464/136 |
| 4,865,485 A | * | 9/1989 | Finnefrock, Sr. ......... 403/322.2 |
| 4,941,862 A | | 7/1990 | Hazebrook et al. |
| 4,962,682 A | | 10/1990 | Rose et al. |
| 5,184,979 A | | 2/1993 | Hazebrook et al. |
| 5,291,809 A | * | 3/1994 | Fox et al. ................ 81/177.85 |
| 5,390,571 A | | 2/1995 | Fox, III et al. |
| 5,433,548 A | | 7/1995 | Roberts et al. |
| 5,531,140 A | * | 7/1996 | Chow ..................... 81/177.85 |
| 5,660,491 A | | 8/1997 | Roberts et al. |
| 5,813,296 A | | 9/1998 | Hoff et al. |
| 6,003,414 A | | 12/1999 | Hsich |
| 6,006,631 A | | 12/1999 | Miner et al. |
| 6,062,112 A | | 5/2000 | Bonniot |
| 6,336,765 B1 | * | 1/2002 | Watanabe ................ 403/322.2 |
| 6,523,441 B2 | * | 2/2003 | Lee ....................... 403/322.2 |
| 6,554,524 B1 | * | 4/2003 | Smith ..................... 403/322.2 |

* cited by examiner

Primary Examiner—Robert J. Sandy
Assistant Examiner—Ruth C. Rodriguez
(74) Attorney, Agent, or Firm—Marshall, Gerstein & Borun LLP

(57) ABSTRACT

A coupling for torque transmitting devices is disclosed. The coupling employs polygonally shaped first and second ends having retaining balls held within each of the corners of the polygon. Pin cones are provided in each of the first and second ends. Actuation of a set screw or the like causes each of the pin cones to push the retaining balls radially outwardly in a simultaneous fashion thereby engaging a first and second members to be coupled.

13 Claims, 5 Drawing Sheets

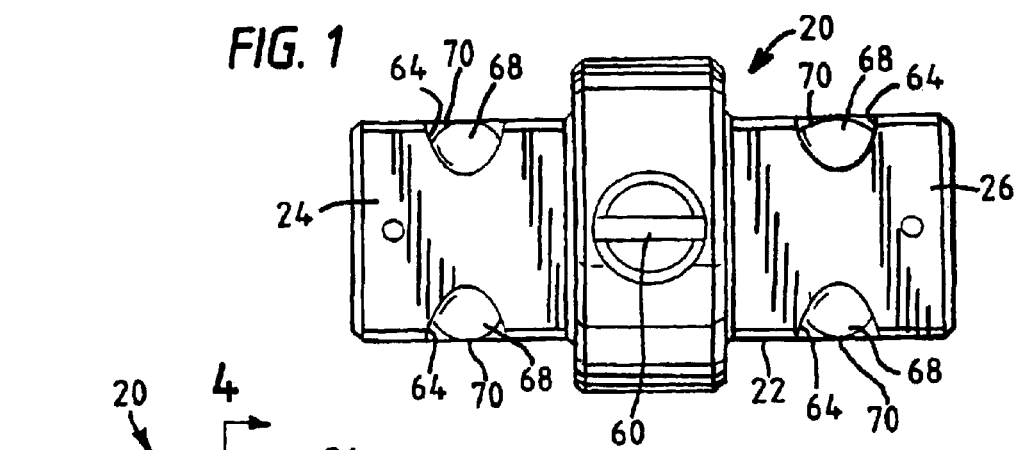
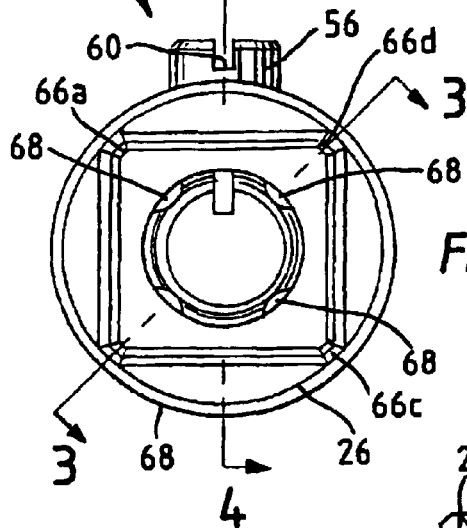
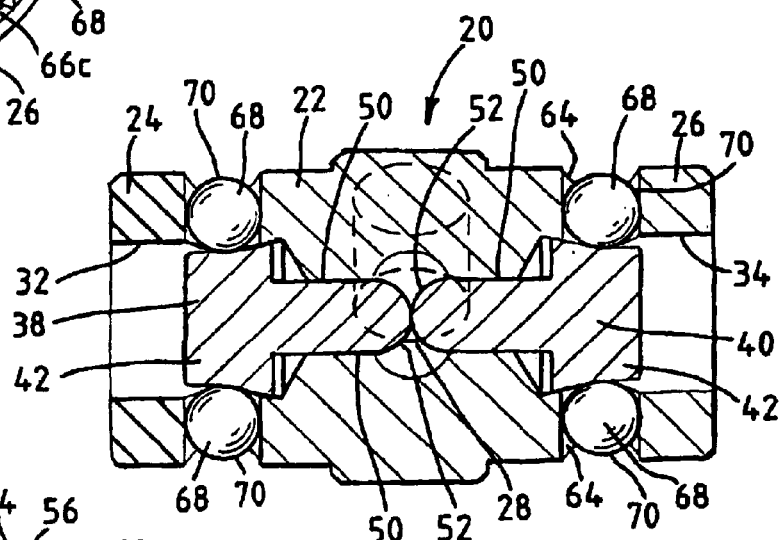
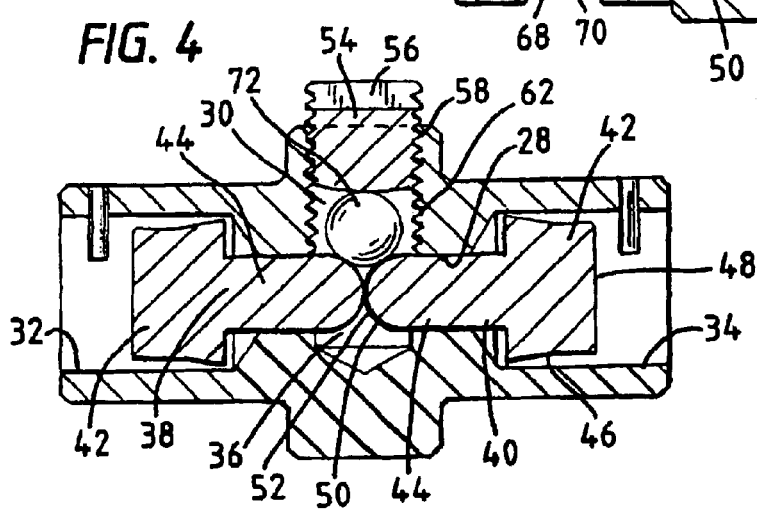

COUPLING WITH ENHANCED CONCENTRICITY MAINTAINABILITY AND TORQUE HANDLING CAPABILITY

FIELD OF THE INVENTION

The invention generally relates to mechanical couplings and, more particularly, relates to mechanical couplings for use with power tools and torque calibration equipment.

BACKGROUND OF THE INVENTION

Efficient transmission of torque loads between two members has been problematic in the hand and power tool industry for many years. Splines, ball detents, keyways, and set screws have been used in various arrangements to couple two components together with external and internal drive elements. These connections add cost, however, and are all not always the most efficient methods of torque transfer.

The hand and power tool internal and external drive square is perhaps the best known example. Such parts are designed to have a removable connection, to allow quick changing of sockets from the working end of the ratchet and/or square drive. To achieve that end, considerable clearances, both across the corners and the flat sides of the drive square are built into the design. Such clearances have been standardized through national (ASME) and international (ISO) organizations to facilitate interchangeability. Such clearances are so large, however, that a ball spring detent system is often needed to prevent the decoupling of the two elements due to a change in position of the drive elements with respect to gravity. Additionally, the design of the square results in a considerable amount of non-perpendicularity tolerance with respect to the drive element.

Moreover, when torque loads are applied to the drive element, the external square makes contact with the corners of the internal square. This contact area is variable due to clearance tolerances in all three planes of engagement. Therefore, coupling stresses may vary considerably, and the center of the square with respect to the theoretical center line varies as well.

While, such lack of precision transfer is a source of inefficiency in terms of torque transfer, it is also a critical source of error and inefficiency in testing and calibration equipment, tools and torque drives.

SUMMARY OF THE INVENTION

In accordance with one aspect of the invention, a coupling for a torque transmission device is provided which comprises a body, at least one retaining ball, a pin cone and a set screw. The body includes first and second ends with at least three sides wherein the three sides define at least three corners. Each corner includes an aperture. A retaining ball is positioned within the body proximate each of the apertures and is adapted to move partially through one of the apertures. The pin cone is slidably disposed within the body and includes first and second cam surfaces wherein the first cam surface is adapted to engage each of the retaining balls. The set screw is threadably mounted in the body, and is adapted to engage the second cam surface of the pin cone.

In accordance with another aspect of the invention, a method of coupling at least two torque transmitting devices is provided which comprises the steps of inserting a first body into a second body, and moving retaining balls from one of the first and second bodies into engagement with the other of the first and second bodies. The retaining balls are proximate corners of both the first and second bodies.

In accordance with another aspect of the invention, a coupling is provided which comprises a first body, a second body, means for connecting the first body to the second body, means for adjusting the torque holding capability of the means for connecting, and means for maintaining concentricity between the first and second bodies.

These and other aspects and features of the invention will become more apparent from the following detailed description when taken in conjunction with the accompanying drawings.

BRIEF DESCRIPTION OF THE DRAWINGS

FIG. 1 is a side view of a coupling constructed in accordance with the teachings of the invention;

FIG. 2 is an end view of a coupling constructed in accordance with the teachings of the invention;

FIG. 3 is a sectional view of the coupling of FIG. 2 taken along line 3—3 of FIG. 2, and depicting the coupling in a disengaged position;

FIG. 4 is a sectional view of the coupling of FIG. 2 taken along line 4—4 of FIG. 2, and depicting the coupling in a disengaged position;

Figure 5:
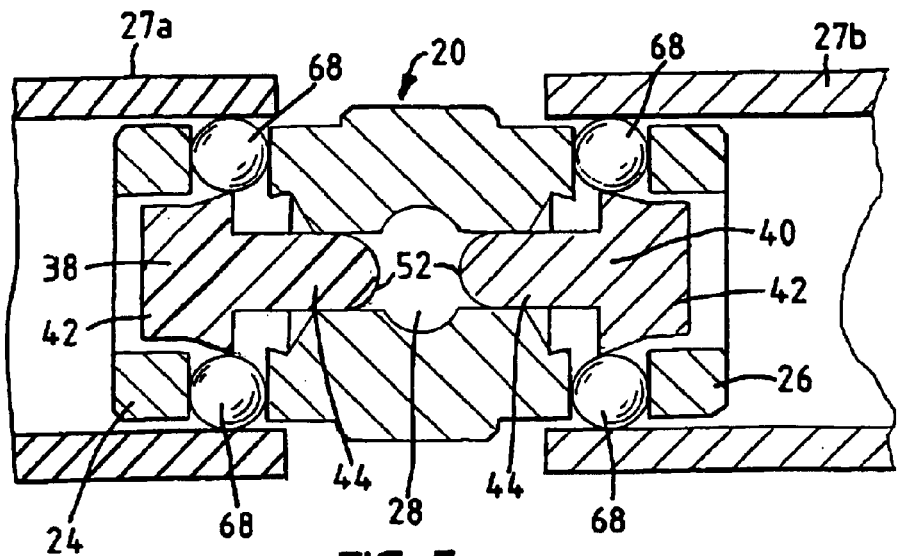
FIG. 5 is a sectional view of the coupling of FIG. 2 taken along line 3—3, but depicting the coupling in an engaged position with coupled members being depicted in fragmentary cross-section.
Figure 6:
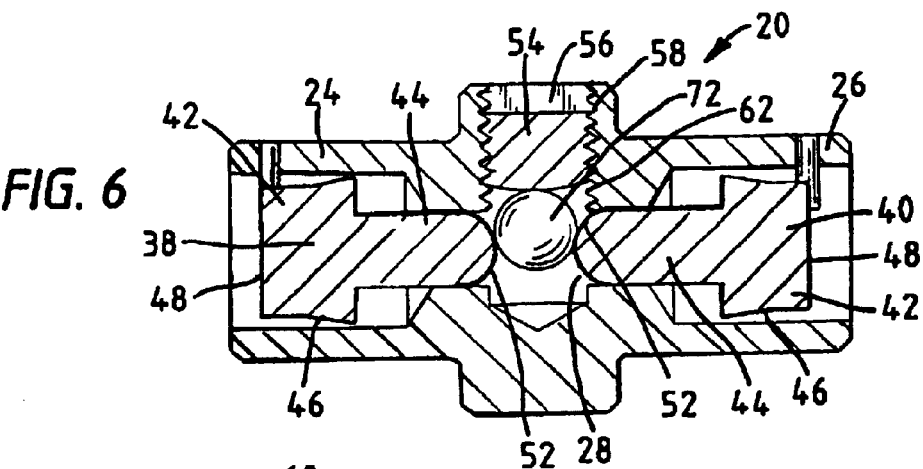
FIG. 6 is a sectional view of the coupling of FIG. 2 taken along line 4—4, but depicting the coupling in an engaged position.

While the invention is susceptible to various modifications and alternative constructions, certain illustrative embodiments have been shown in the drawings and will be described below in detail. It should be understood, however, that there is no intention to limit the invention to the specific forms disclosed, but on the contrary, the intention is to cover all modifications, alternative constructions, and equivalents failing within the spirit and scope of the invention as defined by the appended claims.

DETAILED DESCRIPTION OF THE PREFERRED EMBODIMENTS

Referring now to the drawings, and with specific reference to FIG. 1, a coupling constructed in accordance with the teachings of the invention is generally referred to by reference numeral 20. While the coupling 20 will be described herein primarily in conjunction with hand tools and power tools, as well as torque setting calibration equipment, it is to be understood that the teachings of the invention can be employed with equal efficacy in any other application wherein the efficient and accurate transmission of torque is desired.

Referring now to FIGS. 1–5, the coupling 20 is shown to include a body 22 having a first end 24 and a second end 26.

Each end is adapted to be received in one of a first or second member 27a, 27b (depicted in fragmentary cross-section in FIG. 5) for transmitting torque between the first and second members 27a, 27b. As shown best in FIG. 2, each end 24, 26 is substantially square in cross-section in the depicted embodiment, but it is to be understood that the teachings of the invention can be employed with other polygonal cross-sectional shapes, including but not limited to, hexagonal as depicted in the latter embodiments herein.

As shown best in FIG. 4, the body 22 includes both a longitudinal channel 28, and a lateral channel 30 normal thereto. The longitudinal channel 28 extends from the first end 24 to the second end 26 and includes enlarged diameter end openings 32, 34 as well as a reduced diameter center 36.

First and second pin cones 38, 40 are positioned within the longitudinal channel 28. Each cone 38, 40 includes a head 42 and a stem 44. The head 42 includes a canted or frustoconical annular side 46 and a flat end 48. The stem 44 includes a cylindrical side wall 50 which terminates in a rounded end 52.

A set screw 54 is positioned within the lateral channel 30 as also best depicted in FIG. 4. The set screw 54 includes a head 56 and a threaded stem 58. The head 56 may include a conventional groove 60 to accommodate a flat head screwdriver or the like, or may include any other suitable structure for driving the screw 54 including, but not limited to, Phillips, Allen, and hex heads. The lateral channel 30 includes threads 62 adapted to mate with the threaded stem 58.

Figure 7:
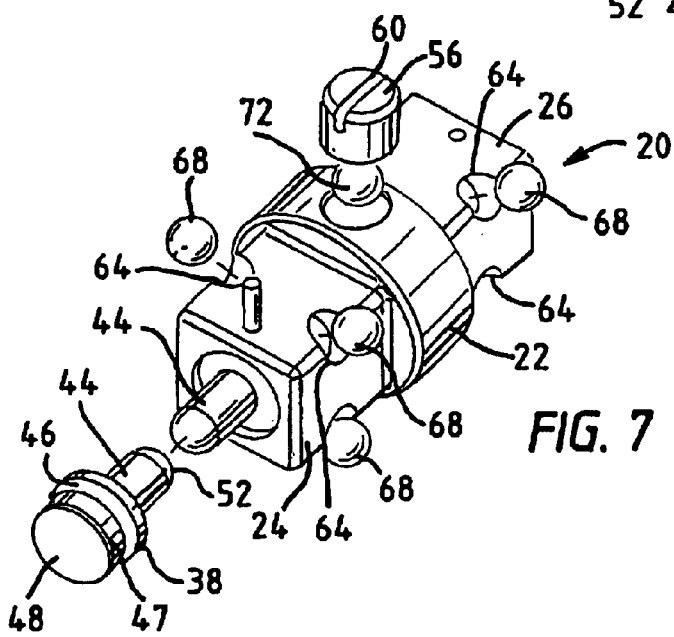
FIG. 7 is an exploded view of the coupling of FIG. 1.
Figure 8A:
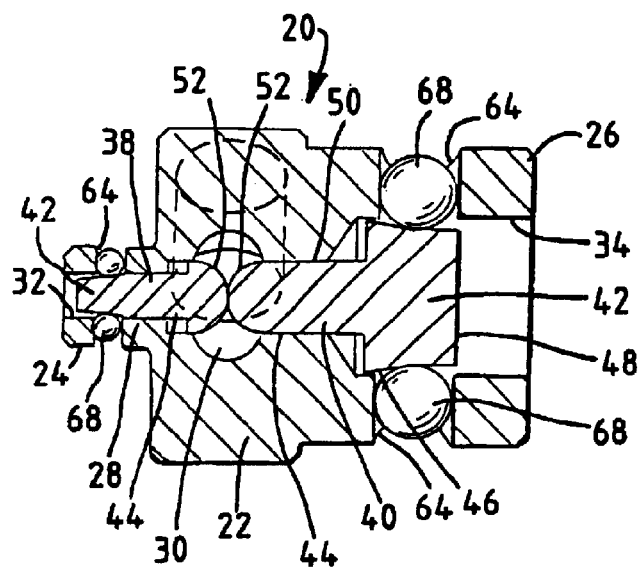
FIGS. 8a–d are sectional views of alternative couplings constructed in accordance with the teachings of the invention.
Figure 8B:
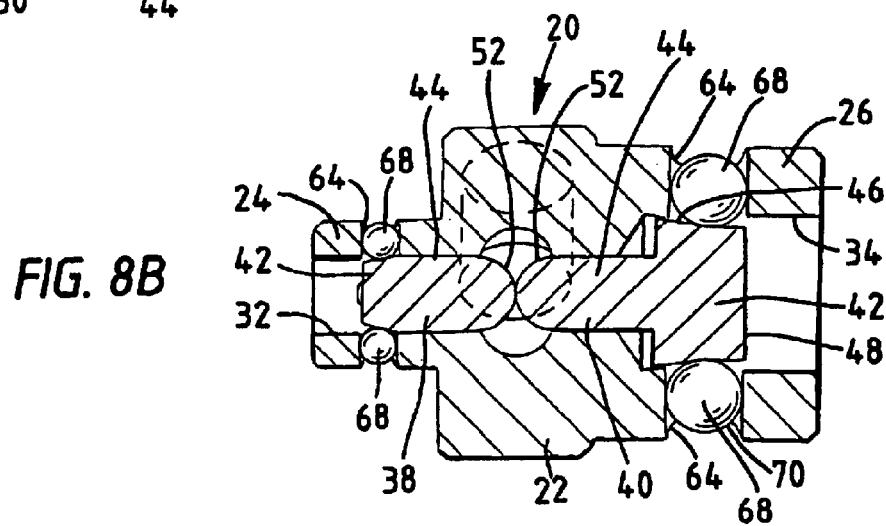
Figure 8C:
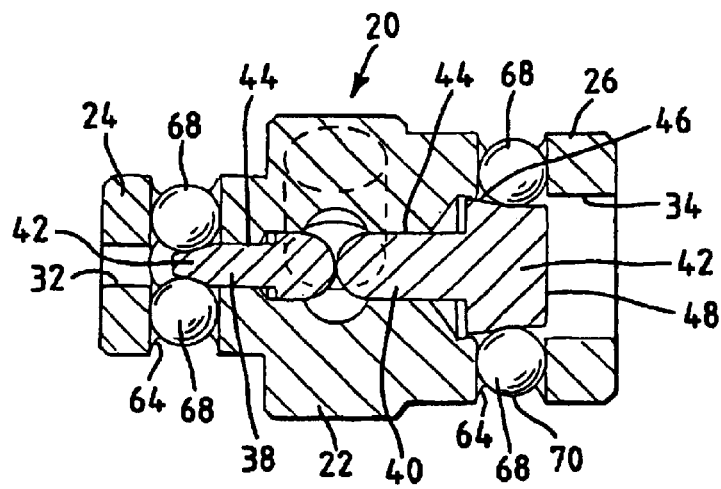
Figure 8D:
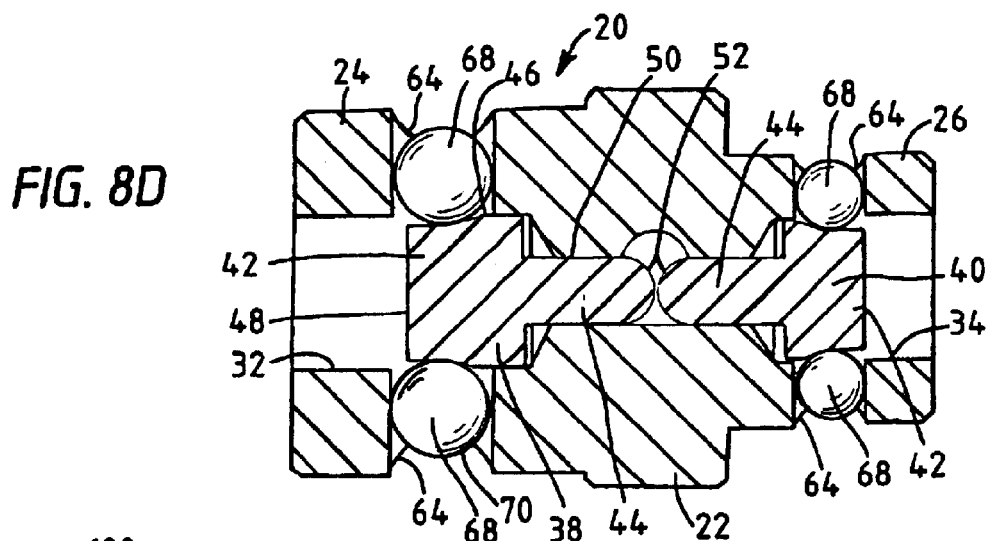
Figure 9:
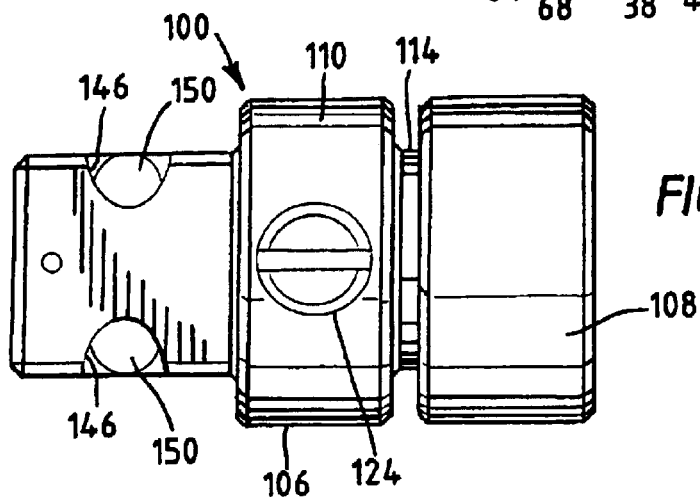
FIG. 9 is a side view of an alternative embodiment of a coupling constructed in accordance with the teachings of the invention.
Figure 10:
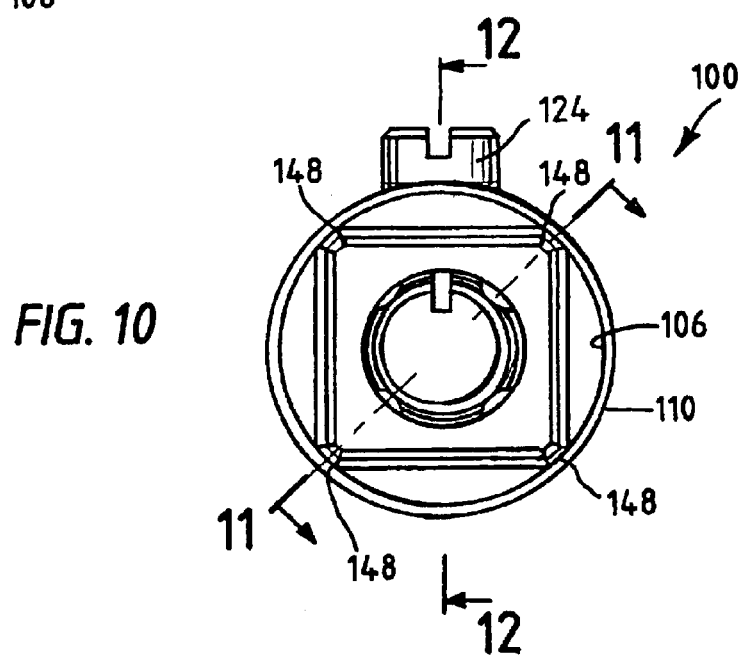
FIG. 10 is an end view of the coupling of FIG. 9.

Referring now to FIGS. 1, 3 and 7, it will be noted that the body 22 includes a plurality of corner apertures 64. In the depicted embodiment, each end 26, 28 of the body includes four corner apertures 64, with one being provided in each of the corners 66a–d of each end 26, 28. If the ends 26, 28 were to be alternatively shaped with more or less corners, a corresponding number of corner apertures 64 would be employed.

A retaining ball 68 is provided in each of the corner apertures 64. The retaining balls 68 are sized so as to be able to extend a circumferential surface 70 thereof partially radially outward through the corner apertures 64. For example, as shown best in a comparison between FIGS. 3 and 5, each retaining ball 68 is adapted to move from a disengaged position (FIG. 3) to an engaged positioned (FIG. 5) in a manner which will be described in further detail herein. An actuation ball 72 is provided within the lateral channel 30 between the threaded stem 58 and the rounded ends 52.

In operation, the coupling 20 is able to connect the first member 27a to the second member 27b with a degree of concentricity and torque transmitting capability heretofore unattainable. The coupling 20 is connected by first inserting the ends 24, 26 into the first and second member 27a, 27b, respectively as shown in FIG. 5. The ends 24, 26 are shaped complementarily to the internal shape of the members 27a, 27b (square in the depicted embodiment).

The set screw 54 is then rotated so as to advance the stem 58 into the lateral channel 30. In so doing the actuation ball 72 is advanced into the lateral channel 30 as well. However, advancement of the actuation ball 72 is against the rounded ends 52 of the pin cones 38, 40. The rounded shape of the actuation ball 72 and the rounded ends 52 results in a camming action pushing the pin cones 38, 40 apart as shown in FIG. 5.

As the pin cones 38, 40 are pushed apart, the annular canted surface 46 engages the circumferential surface 70 of each retaining ball 68, thereby pushing the retaining balls 68 radially outwardly through the corner apertures 64. The balls 68 are pushed into engagement with the members 27a, 27b by further rotation of the set screw 54. Since each of the retaining balls 68 is radially advanced the same distance, the coupling is ensured of concentricity with the members 27a, 27b. Moreover, a single actuation of the set screw 54 secures both members 27a, 27b, with enhanced torque handling capability.

It is to be understood that teachings of the invention can be employed to connect members 27a, 27b of dissimilar dimensions and shapes. For example, FIGS. 8a–d depict couplings 20 having identical structure, but ends 24, 26 of dissimilar dimension. Accordingly, reference numerals identical to those employed in FIGS. 1–7 are used. The dimensions may be any possible dimension, but certain examples include, but are not limited to, couplings having on ¾" to 1" ratio, a ¼" to ¾" ratio, a ⅜" to ¾" ratio and ½" to ¾" ratio. It will further be noted that either end 24 or 26 could be made the smaller of the two ends. While each of the embodiments of FIGS. 8a–d include square ends, couplings 20 can be made with ends 24, 26 or dissimilar shape, e.g., one square end, and one hexagonal end.

Referring now to FIGS. 9–12, an alternative embodiment of a coupling constructed in accordance with the teachings of the invention is generally referred to by reference numeral 100. The coupling is adapted to connect a first member 102 to a second member 104 as shown in fragmentary cross-section in FIG. 12. The first member 102 is shown to be square in lateral cross-section while the second member 104 is shown to be hexagonal in lateral cross-section, but it is to be understood that the teachings of the invention can be employed to couple members having any desired polygonal cross-sectional shape.

The coupling 100 includes a first body 106 inserted telescopingly into a second body 108. The first body 106 includes an enlarged diameter section 110 flanked by a first and second reduced diameter sections 112, 114. The enlarged diameter section 110 includes a lateral channel 116, while the first reduced diameter section 112 includes a longitudinal channel 118. The lateral channel 116 includes internal threads 120 adapted to be mated with external threads 122 of a set screw 124. The longitudinal channel 118 includes a shoulder 126 defining a division between an opening 128 and a mouth 130. The mouth 130 is in direct communication with the lateral channel 116 of the enlarged diameter section 110.

A pin cone 132 is slidably disposed within the longitudinal channel 118. The pin cone 132 includes a head 134 and a stem 136. The head 134 includes canted sides 138 defining a first cam surface 139. The stem 136 includes a rounded end defining a second cam surface 140. The second cam surface 140 is adapted to be in engagement with an actuation ball 142 which in turn is in engagement with a bottom surface 144 of the set screw 124.

Figure 11:
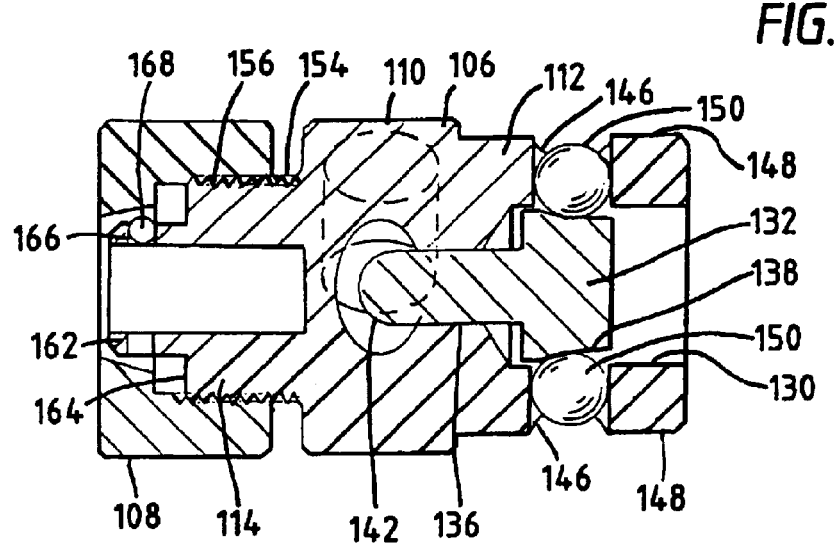
FIG. 11 is a sectional view of the coupling of FIG. 10 taken along line 11—11 of FIG. 10.
Figure 12:
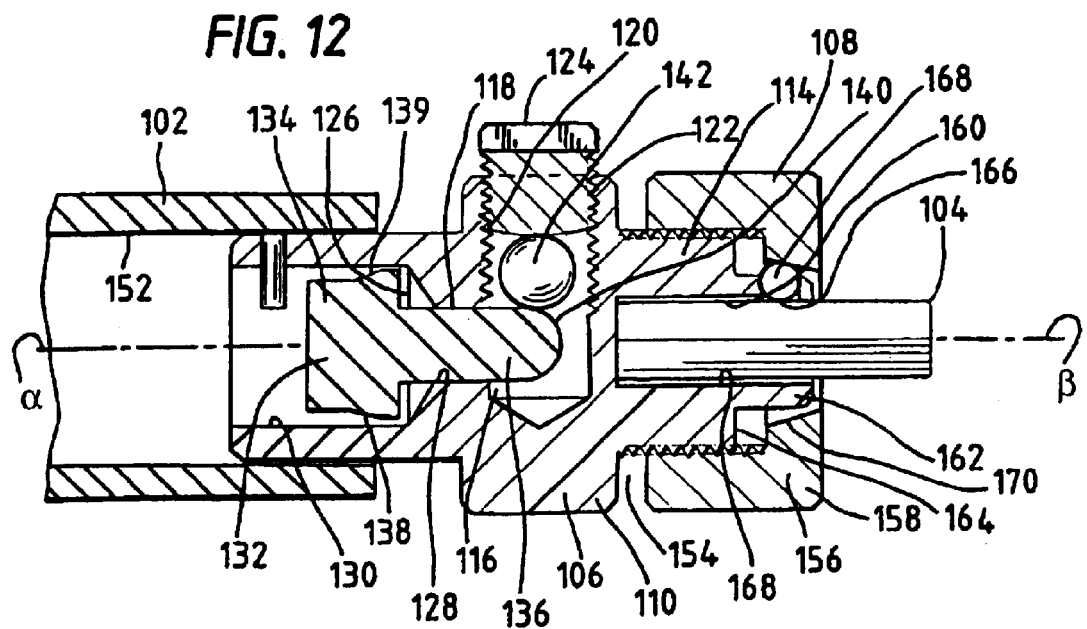
FIG. 12 is a sectional view of the coupling of FIG. 10 taken along line 12—12 of FIG. 10.

As shown best in FIGS. 11 and 12, the first reduced diameter section 112 includes a plurality of radially extending apertures 146 provided in corners 148. In the depicted embodiment, the first reduced diameter section 112 is square in lateral cross-section and thus includes four corners 148 and apertures 146, but it is to be understood that the first reduced diameter section 112 may be of alternative shapes, and that such shapes may include a lesser or greater number of corners. Accordingly, a lesser or greater number of apertures 146 will be provided in such alternative embodiments with one such aperture being provided in each of the corners 148.

Proximate each of the apertures 146, a retaining ball 150 is provided. Each of the retaining balls 150 includes a diameter slightly greater than the diameter of each of the apertures 146. Accordingly, the retaining balls 150 are held within the first reduced diameter section 112, but can be extended partially through each of the apertures 146 for engagement with an internal surface 152 of the first member 102. Such motion can be accomplished by appropriate rotation of the set screw 124. More specifically, if the set screw 124 is rotated in a direction causing the bottom surface 144 of the set screw 124 to be laterally translated into the enlarged diameter section 110, the bottom surface 144 causes the actuation ball 142 to be moved into the lateral channel 116, against the second cam surface 140 of the pin cone 132. The curved surfaces of the actuation ball 142 and second cam surface 140, as well as the force generated by the downwardly moving set screw 124 cause the pin cone 132 to move toward the opening 128 in the first reduced diameter section 112.

Accordingly, the head 134 of the pin cone 132 is moved away from the shoulder 126 thereby causing the first cam surface 139 of the pin cone 132 to push against each of the retaining balls 150. The first cam surface 139 is pushed simultaneously against each of the retaining balls 150 causing each of the retaining balls 150 to move through a respective aperture 146 in identical fashion. In so doing, the first reduced diameter section 112 is concentrically aligned within the first members 102 upon a single actuation of the set screw 124.

Referring again to FIGS. 11 and 12, the second reduced diameter section 114 includes a threaded outer surface 154 in engagement with internal threads 156 of the second body 108. The second reduced diameter section 114 further includes an internal receiving channel 160 shaped to receive the second member 104. In the depicted embodiment the channel 160 and second member 104 are hexagonal in lateral cross-section.

A rim 162 extends from an end 164 of the second reduced diameter section 114 and includes a groove 166 retaining a ball 168. The ball 168 is not only held within the groove 166, but is adapted to be in engagement with a cam surface 170 provided within the second body 108. It can therefore be seen that upon rotation of the second body 108, the canted or cam surface 170 of the second body 108 causes the ball 168 to be pushed against the second member 104 thereby retaining the second member 104 in the coupling 100. In so doing, the longitudinal axis * of the first member 102 is concentric and aligned with the longitudinal axis * of the second member 104.

In operation, the coupling 100 can be employed to accurately align, and maintain in concentricity, the first member 102 and the second member 104. The coupling 100 is able to do so by, among other things, inserting the first reduced diameter section 112 into the first member 102, and rotating set screw 124 in a first direction causing the bottom surface 144 to depress the actuation ball 142 into the enlarged diameter section 10. Accordingly, the pin cone 132 is moved, causing the retention balls 150 to engage the internal surface 152 of the first member 102.

The second member 104 is secured to the coupling 100 by inserting a second member 104 into the receiving groove 168 of the second reduced diameter section 114 and rotatingly the second body 108. In so doing, the retaining ball 168 is forced by the cam surface 170 of the second body 108 against the second member 104.

The teachings of the invention therefore not only allow first and second members to be coupled, but also allow such coupling while maintaining the concentricity of both members, and providing a substantially increased torque holding capability over prior art couplings.

What is claimed is:

1. A coupling for torque transmitting devices, comprising:

a body having first and second ends and at least three sides, the three sides defining at least three corners, each corner having an aperture;

a retaining ball positioned within the body proximate each aperture, each retaining ball adapted to move partially through one of the apertures;

a pin cone slidably disposed within the body, the pin cone having first and second cam surfaces, the first cam surface adapted to engage each of the retaining balls; and a set screw threadably mounted in the body, the set screw adapted to engage the second cam surface of the pin cone.

2. The coupling of claim 1, further including an actuation ball disposed between the pin cone and the set screw.

3. The coupling of claim 1, wherein the set screw is disposed through one of the body sides.

4. The coupling of claim 1, further including a second pin cone slidably disposed within the body, the pin cone having first and second cam surfaces, the first cam surface adapted to engage a plurality of retaining balls, the set screw adapted to engage the second cam surface.

5. The coupling of claim 1, wherein the body is square in lateral cross-section.

6. The coupling of claim 1, wherein the body is hexagonal in lateral cross-section.

7. The coupling of claim 1, wherein the body first and second ends are dissimilarly shaped.

8. The coupling of claim 1, wherein the body first and second ends are dissimilarly dimensioned.

9. The coupling of claim 1, wherein the pin cone includes a head and a stem, the head including a canted circumference defining the first cam surface, the stem including a rounded end defining the second cam surface.

10. The coupling of claim 1, wherein the retaining balls move radially outward to engage a coupled member.

11. The coupling of claim 1, wherein the coupling is part of a torque measurement device.

12. The coupling of claim 1, wherein the coupling is part of a hand tool.

13. The coupling of claim 1, wherein the coupling is part of a power tool.

* * * * *